United States Patent
De Haan et al.

(10) Patent No.: US 6,930,676 B2
(45) Date of Patent: Aug. 16, 2005

(54) ANTI MOTION BLUR DISPLAY

(75) Inventors: Gerard De Haan, Eindhoven (NL); Michiel Adriaanszoon Klompenhouwer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 380 days.

(21) Appl. No.: 10/172,417

(22) Filed: Jun. 14, 2002

(65) Prior Publication Data

US 2003/0006991 A1 Jan. 9, 2003

(30) Foreign Application Priority Data

Jun. 18, 2001 (EP) .............................. 01202323
Aug. 30, 2001 (EP) .............................. 01203263

(51) Int. Cl.[7] .............................. G09G 5/00
(52) U.S. Cl. ................. 345/204; 345/473; 345/581; 345/606; 345/607; 345/608; 345/609; 345/690; 348/94; 348/208.1; 348/208.4; 348/208.13; 348/910; 382/260; 382/264; 382/274; 382/299; 358/509
(58) Field of Search ........................ 348/94, 97, 910, 348/208.1, 208.4, 208.13; 382/299, 260, 264, 274; 358/509; 345/473, 204, 690, 606, 607, 608, 609, 428, 581

(56) References Cited

U.S. PATENT DOCUMENTS 5,712,474 A * 1/1998 Naneda .................... 250/208.1
5,903,680 A     5/1999 De Haan et al. ............ 382/265

FOREIGN PATENT DOCUMENTS

| EP | 0657860 A2 | 12/1994 | ............ G09G/3/20 |
| GB | 1605025 A | 12/1981 | ............ H04N/5/14 |
| WO | 0042778 A | 7/2000 | ........... H04N/5/028 |

* cited by examiner

Primary Examiner—Xiao Wu
Assistant Examiner—Abbas Abdulselam
(74) Attorney, Agent, or Firm—Edward W. Goodman

(57) ABSTRACT

A method, a circuit arrangement and a display device which suppresses motion blur due to motion integration carried out along a motion trajectory on the image data, which occurs in matrix type displays in which a motion trajectory is integrated by the viewer and/or the display, includes an inverse integration filtering of the video signal. To avoid de-blurring in image regions where motion cannot be detected, or image is low and to avoid noise modulation, motion estimation as well as further image characteristic are used.

7 Claims, 1 Drawing Sheet

ANTI MOTION BLUR DISPLAY

BACKGROUND OF THE INVENTION

1. Field of the Invention

The invention relates to a method for reducing motion blur of images shown in display devices, in particular, resulting from integration by the viewer of pixel intensities along the motion trajectory, which can be interpreted as a low-pass filtering in the spatial domain, due to motion-dependant spatial low-pass filtering on image data along a motion trajectory, in which motion vectors depending on moving components of an input video signal are calculated, filter coefficients depending on said motion vectors are calculated, said input video signal is filtered depending on said filter coefficients providing a filtered video signal, an output video signal is generated by combining said input video signal and said filtered video signal, and images are generated on said display device depending on said output video signal. The invention further relates to a circuit arrangement providing anti-motion blur function and a non-stroboscopic display device. Said motion-dependant spatial low-pass filtering might as well be caused by the display itself.

The invention provides a favorable dynamic behavior of non-stroboscopic display devices, such as, Liquid Crystal Displays, Plasma Panel Display or Color Sequential Displays.

2. Description of the Related Art

European Patent Application No. EP 0 657 860 A2 discloses that motion blur in non-stroboscopic displays can be reduced by filtering an input video signal. The filtering is carried out as a speed-dependant high spatial frequency enhancement. As the viewer of moving objects on a matrix display integrates the intensity of the pixels along the motion trajectory, which corresponds to a low-pass filtering in the spatial frequency domain, motion blur may be reduced by filtering the high spatial frequency of moving objects. According to this document, matrix video display systems for displaying moving images comprise a matrix display panel having a row and column array of picture elements for producing display outputs, and a picture element drive circuit for driving the picture elements according to a video signal applied to an input by addressing the rows of picture elements in sequence repetitively in successive fields, with the picture elements holding their display outputs for at least a substantial part of the interval between successive addressing. These matrix display devices are non-stroboscopic displays. To reduce motion blur, it is proposed that a speed-dependant high spatial frequency enhancement filter circuit is provided, via which video information of a video signal applied to said input is supplied to the picture element drive circuit and which enhances the spatial frequencies of moving components in the image to be displayed according to the speed of the moving components. The higher the speed of the moving components, the larger the part of the spectrum that needs enhancement.

A drawback of the proposed solution is that in areas where the motion vector is not reliable, i.e., in areas where there is little contrast, filtering may be carried out without improving the picture. Furthermore, this filtering may even cause noise modulation. In such a case, flat parts of the picture are filtered where filtering cannot improve significant detail. It can, however, result in visible differences in noise patterns.

SUMMARY OF THE INVENTION

It is an object of the invention to provide an exact spatial filtering with reduced noise modulation.

To solve the object of the invention, it is proposed that the enhancement filter further depends on image characteristics determining high spatial frequency properties of said video signal. By using further image properties, in particular, local image characteristics, which determine high spatial frequencies, filtering in flat regions of the image, e.g., undetailed areas, can be avoided. This filtering may be carried out by second filtering means as well as enhanced first filtering means. The calculation or estimation of the motion vector may then contain slight errors. These errors might be suppressed, as the filter does use additional information regarding high spatial frequencies of the image to carry out the high spatial frequency filtering. The filtering is thus limited to regions, where it can bring advantages to the dynamic behavior of the display.

Image characteristics, such as, image detail, and/or image contrast, and/or image texture, and/or a mean signal value, and/or a peak to peak value, are further proposed. Thus, the output of the filter is more reliable. By using more image characteristics, noise modulation, which is undesired, can be reduced.

In a further preferred embodiment of the invention, the input video signal is filtered by means of a high spatial frequency boosting filter depending on the filter coefficients. As the viewer and/or the display low-pass filters the images, it is necessary to provide an inverse filtering to reconstruct the original signal. The high spatial frequency boosting filter provides an approximate inverse function to the low-pass filtering carried out by the viewer and/or the display. The filter may be a finite impulse response (FIR) as well as an infinite impulse response (IIR) filter.

The output of a high spatial frequency boosting filter can be compared to the input video signal. Differences between these two signals depend on the estimated motion vectors, at least. In flat areas, or in areas with high contrast detail, a high spatial frequency boosting might not be wanted. To provide these features, the input video signal is compared to the filtered video signal, the resultant compared video signal is filtered by a masking circuit, and the output video signal is generated by combining the input video signal and the masked video signal. The masking circuit might apply a ramp function to the compared video signal. Also, masking circuits suppressing low and very high output values are possible. Suppressing the frequency boosting should be carried out in the event of high contrast detail. Such boosting would otherwise lead to clipping or the dynamic range of the signal would need to be decreased to prevent such peaking at the cost of average brightness of the screen.

In a further preferred embodiment, the masking circuit provides a threshold masking to the compared video signal, below the threshold, the compared video signal is substantially suppressed, and above the threshold, the compared video signal is at least partially boosted. By using threshold values, differences between the input video signal and the filtered video signal caused by imprecise motion vectors occurring in flat areas of the picture are not boosted. Only output signals of the high spatial frequency boosting filter above a defined threshold value are not suppressed.

A further aspect of the invention is a circuit arrangement for providing motion blur suppression to video displays, in particular, with a previously described method, comprising motion calculating means for calculating motion vectors in a video signal, means for calculating filter coefficients depending on said motion vectors, first filtering means for filtering the video signal depending on said filter coefficients, and means for adding the filtered video signal to the input video signal, characterized in that the circuit arrangement further comprises second filtering means for filtering the video signal depending on image characteristics determining high spatial frequency properties of the video signal. The second filtering means may be comprised in the first filtering means as an enhancement of the first filtering means. Alternatively, the second filtering means may be provided by an independent new filtering circuit.

Yet a further aspect of the invention is a non-stroboscopic display device, in particular a Liquid Crystal Display (LCD), a Thin Film Transistor Display (TFT), Color Sequential Display, or a Plasma Display Panel (PDP) comprising the previously described circuit arrangement.

BRIEF DESCRIPTION OF THE DRAWING

These and other aspects of the invention will be apparent from and elucidated with reference to the embodiments described hereinafter. In the drawing.

DESCRIPTION OF THE PREFERRED EMBODIMENTS

Figure 1:
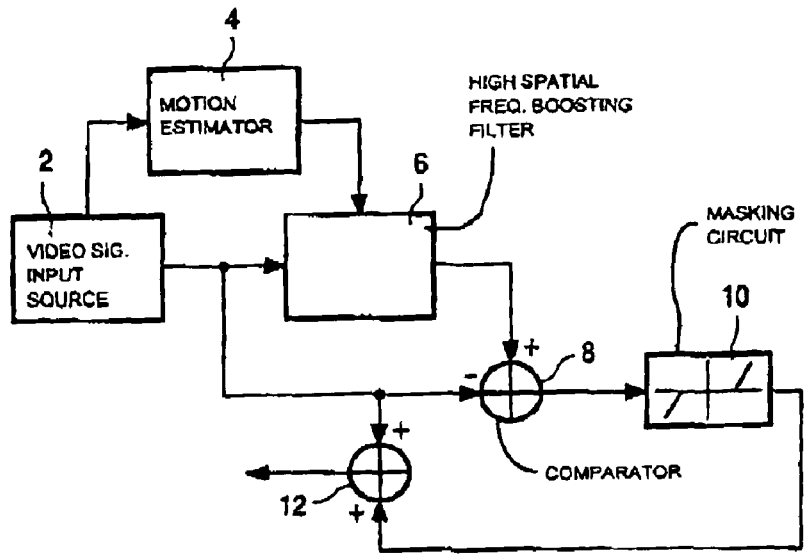
FIG. 1 is a circuit block diagram of a first embodiment of an anti-motion blur filter.

In cathode ray tubes, each pixel of a displayed image is generated as a pulse, which is very short compared to the picture time. Different to cathode ray tubes, in new flat, high quality, low cost displays devices, each pixel is displayed during most of the picture time. In case any part of the picture contains motion, the viewer will track this motion. As each pixel is displayed substantially the whole picture time, the intensity of pixels showing the motion is integrated along the motion trajectory as follows:

$$F_{out}(\vec{x}, n) = \frac{1}{t_i} \int_0^{t_i} F\left(\vec{x} + \frac{t}{T}\vec{D}, n\right) dt \quad (1)$$

where $t_i$ is the display time, F is the input video signal, $F_{out}$ is the output video signal, and T is the picture period. The vector D is the product of the object velocity and the picture period. In case $t_i$ is constant, the integration is the same as a convolution of F(x,n) and a sample-and-hold function h(x):

$$F_{out}(\vec{x}, n) = \frac{T}{t_i} \int_0^{t_i/T} F(\vec{x} + \alpha\vec{D}, n) d\alpha \quad (2)$$

$$= \int_{-\infty}^{\infty} F(\vec{x} + \alpha\vec{D}, n) h_1(\alpha\vec{D}) d\alpha$$

$$= F(\vec{x}, n) * h(\vec{x})$$

where h(x) is:

$$h_1(\alpha\vec{D}) = \begin{cases} \frac{T}{t_i}, & 0 \leq \alpha \leq \frac{T}{t_i} \\ 0, & \text{otherwise} \end{cases} \quad (3)$$

From an analysis in the Fourier domain, it is apparent that the original signal can be reconstructed by inverse filtering the output signal:

$$F(\vec{f}, n) = \frac{F_{out}(\vec{f}, n)}{H(\vec{f})} = \frac{F_{out}(\vec{f}, n)}{\text{sinc}\left(\pi\frac{t_i}{T}\vec{D}\cdot\vec{f}\right)} \quad (4)$$

As the transfer function H(f) contains zeros, this inverse filtering is not practicable. In practice, a modified filter is required. Such a filter boosting high spatial frequencies with a similar behavior as the sin(c) function is:

$$F_{out1}(\vec{x}, n) = F(\vec{x}, n) + G(\vec{D}) \sum_{k,l,n} C(\vec{D}, l, k) F\left(\vec{x} + \binom{k}{l}, n\right) \quad (5)$$

with the second term of the equation being a high-pass finite impulse response filter, the coefficients of which depending on the motion vector D.

As this boosting of high spatial frequencies contains the risk that variations of the filter in areas where the motion vector D is unreliable become visible as a modulation of the noise, these unreliable vectors have to be eliminated or suppressed.

FIG. 1 depicts a diagrammatic circuit arrangement which enables the reduction of motion blur and noise modulation. FIG. 1 shows a video signal input source 2, a motion estimator circuit 4, an high spatial frequency boosting filter 6, a comparator 8, a masking circuit 10 and an adder 12.

A video signal from the video signal input source 2 is fed to the motion estimator circuit 4. In the motion estimator circuit 4, motions in the images of the video signal are estimated and filter coefficients are calculated depending on the estimated motion vectors. The higher the motion in an image, the bigger the motion vectors. The filter coefficients are fed to the high spatial frequency boosting filter 6, which may be an IIR or an FIR filter as depicted in the equation (5) above.

By filtering the video signal according to the filter coefficients, high spatial frequencies are boosted. The output signal of the high spatial frequency boosting filter 6, where high spatial frequencies are peaked and low spatial frequencies are constant, is fed to the comparator 8 which calculates and outputs the differences between the input video signal and the boosted video signal. Thus, the comparator 8 only has an output when the high spatial frequency boosting filter 6 has changed the input video signal.

In flat areas, where most motion estimation circuits have difficulties in finding a valid motion vector, the filter coefficients, and thus, the output of the high spatial frequency boosting filter 6, are not reliable. In areas where the output of the motion estimator circuit 4 is not reliable, the output of the high spatial frequency boosting filter 6, and, in the following, the output of the comparator 8, have low amplitudes. To suppress these low amplitudes, the masking circuit 10 provides masking functionality to the filter. It is also possible to mask high amplitude high frequencies, as these frequencies derive from high contrast detail areas of the picture. If these high amplitude frequencies would be peaked by the high spatial frequency boosting filter 6, the overall dynamic range of the display would have to be decreased at the cost of average brightness of the picture, otherwise clipping would occur. A masked signal is fed to the adder 12, where it is added to the input video signal. The output signal is:

$$F_{out2}(\vec{x}, n) = \begin{cases} F(\vec{x}, n), & (|F_{out1}(\vec{x}, n) - F(\vec{x}, n)|) \leq Th \\ F_{out1}(x, n) + Th, & (F_{out1}(\vec{x}, n) - F(\vec{x}, n)) < -Th \\ F_{out1}(x, n) + Th, & (F_{out1}(\vec{x}, n) - F(\vec{x}, n)) > +Th \end{cases} \quad (6)$$

where Th is a threshold value that prevents boosting in low contrast areas, e.g., in areas where the filter coefficients are not reliable.

Figure 2:
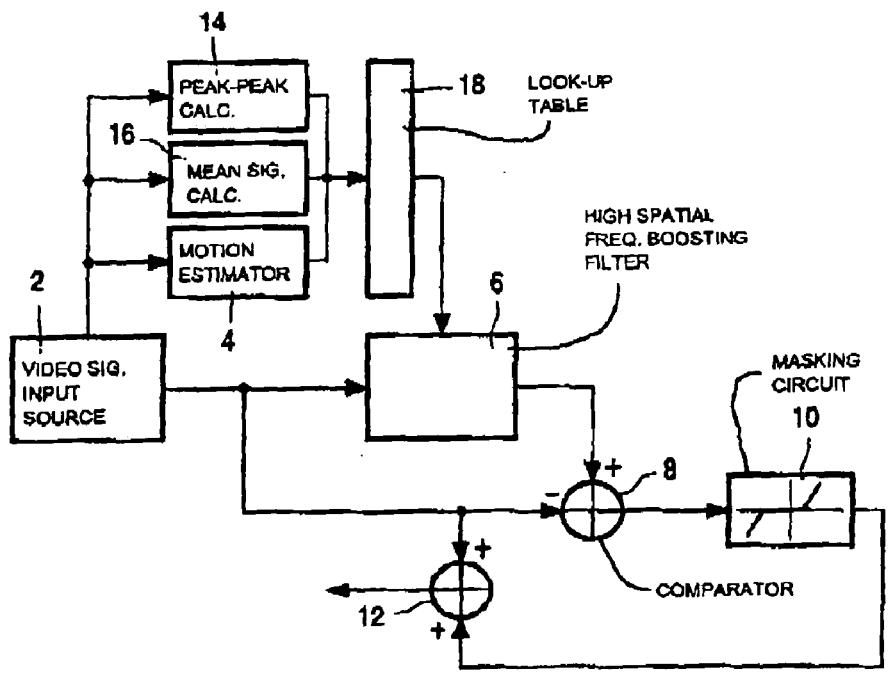
FIG. 2 is a circuit block diagram of a second embodiment of an anti-motion blur filter.

A further preferred embodiment of the invention is depicted in FIG. 2. In addition to that shown in FIG. 1, FIG. 2 shows a peak-to-peak calculator 14, a mean signal value calculator 16, and a look-up table 18. In particular, while this embodiment is preferred in Plasma Display Panels, it is not restricted to this display type. As the main motion blurring is caused by the most significant bit or pixel that varies due to the image detail, this information can be used in combination to the estimated motion vector to determine the filter coefficients for the high spatial frequency boosting filter 6.

Besides the motion estimation carried out by motion estimator 4, a peak-to-peak value of a high frequency video component of the input video signal is calculated by the peak-to-peak calculator 14. In addition, the mean signal value is calculated by the mean signal value calculator 16. These values, in addition to the motion vector, are used to calculate filter coefficients for the high spatial frequency boosting filter 6. The calculated filter coefficients are stored in the lookup table 18 and can be read by the high spatial frequency boosting filter 6.

The invention prevents motion blur occurring in matrix-type displays. As motion vectors are not always reliable, further image characteristics are used to overcome the uncertainty of motion vector estimation. Thus, noise modulation in flat image areas can be avoided, and de-blurring is only carried out in image regions where it makes sense. Otherwise, de-blurring is suppressed.

What is claimed is:

1. A method for reducing motion blur of images shown in display devices, in particular, resulting from integration by the viewer of pixel intensities along the motion trajectory which can be interpreted as a low-pass filtering in the spatial domain, due to motion-dependant spatial low-pass filtering of image data along a motion trajectory, said method comprising the steps:

calculating motion vectors depending on moving components of an input video signal filter coefficients depending on said motion vectors;

filtering said input video signal depending on said filter coefficients forming a filtered video signal;

generating an output video signal by combining said input video signal and said filtered video signal; and generating images on said display device depending on said output video signal, characterized in that said method further comprises the step:

further filtering said input video signal depending on image characteristics determining high spatial frequency properties of said video signal.

2. The method as claimed in claim 1, characterized in that said image characteristics are image detail, and/or image contrast, and/or image texture, and/or a mean signal value, and/or a peak-to-peak value.

3. The method as claimed in claim 1, characterized in that said filtering is performed by a high spatial frequency boosting filter depending on said filter coefficients.

4. The method as claimed in claim 1, characterized in that said steps of generating an output video signal and further filtering said input video signal, comprises the steps:

comparing said input video signal to said filtered video;

filtering said compared video signal using a masking circuit; and generating said output video signal by combining said input video signal and said masked video signal.

5. The method as claimed in claim 4, characterized in that said masking circuit provides a threshold masking to said compared video signal, that below said threshold said compared video signal is substantially suppressed, and that above said threshold said compared video signal is at least partially boosted.

6. A circuit arrangement for providing motion blur suppression to video displays, comprising:

motion calculating means for calculating motion vectors in a video signal;

means for calculating filter coefficients depending on said motion vectors;

first filtering means for filtering said video signal depending on said filter coefficients; and means for adding said filtered video signal to said input video signal, characterized in that said circuit arrangement further comprises:

second filtering means for filtering said video signal depending on image characteristics determining high spatial frequency properties of said video signal.

7. A non-stroboscopic display device being one of the group, a Liquid Crystal Display, a Thin Film Transistor Display, Color Sequential Display, or a Plasma Display Panel, said display device comprising a circuit arrangement as claimed in claim 6.

* * * * *